United States Patent
Haas et al.

(10) Patent No.: US 9,458,805 B2
(45) Date of Patent: Oct. 4, 2016

(54) METHOD AND APPARATUS FOR PUMPING FUEL TO A FUEL INJECTION SYSTEM

(71) Applicant: Westport Power Inc., Vancouver (CA)

(72) Inventors: Jordan C. Haas, Richmond (CA);
Timothy N. Lennox, Coquitlam (CA);
David K. Mumford, Vancouver (CA);
B. Keir Pritchard, North Vancouver (CA); Mark Tsui, Surrey (CA)

(*) Notice: Subject to any disclaimer, the term of this patent is extended or adjusted under 35 U.S.C. 154(b) by 237 days.

(21) Appl. No.: 14/271,646

(22) Filed: May 7, 2014

(65) Prior Publication Data

US 2014/0238351 A1 Aug. 28, 2014

Related U.S. Application Data

(63) Continuation of application No. PCT/CA2012/050805, filed on Nov. 14, 2012.

(30) Foreign Application Priority Data

Nov. 16, 2011 (CA) ...................................... 2758246

(51) Int. Cl.
*F02B 13/00* (2006.01)
*F02M 21/02* (2006.01)
(Continued)

(52) U.S. Cl.
CPC .......... *F02M 39/02* (2013.01); *F02D 19/0605* (2013.01); *F02D 19/0647* (2013.01); *F02D 19/0678* (2013.01); *F02D 19/0684* (2013.01); *F02D 19/0689* (2013.01);
(Continued)

(58) Field of Classification Search
CPC .. F02M 39/02; F02M 63/0001; F02M 43/02; F02M 37/0052; F02M 37/06; F02M 37/08; F02M 37/043; F02M 59/38; F02D 19/0694; F02D 19/0605; F02D 19/0647; F02D 19/0684; F02D 19/10; F02D 19/0689; Y02T 10/36
USPC ....... 123/299, 300, 525, 431, 575, 446, 457, 123/497, 510, 511
See application file for complete search history.

(56) References Cited

U.S. PATENT DOCUMENTS 2,767,691 A * 10/1956 Mengelkamp ............ F02B 7/00
123/1 A
5,067,467 A 11/1991 Hill et al.
(Continued)

FOREIGN PATENT DOCUMENTS

CA 2204983 A1 11/1998
CA 2523732 A1 4/2006
(Continued)

OTHER PUBLICATIONS

International Search Report and Written Opinion of the International Searching Authority issued on Feb. 4, 2013, in connection with International Application No. PCT/CA2012/050805.
(Continued)

*Primary Examiner* — Hai Huynh
(74) *Attorney, Agent, or Firm* — Corridor Law Group, P.C.

(57) ABSTRACT

A method and apparatus pump fuel to a fuel injection system in an internal combustion engine. The method comprises steps of pumping a liquid fuel to a first pressure, using the liquid fuel at the first pressure as a hydraulic fluid for driving a gaseous fuel pump, and pumping a gaseous fuel to a second pressure with the gaseous fuel pump.

47 Claims, 6 Drawing Sheets

(51) Int. Cl.
*F02M 39/02* (2006.01)
*F02D 19/06* (2006.01)
*F02D 19/10* (2006.01)
*F02M 37/00* (2006.01)
*F02M 43/02* (2006.01)
*F02M 59/38* (2006.01)
*F02M 63/00* (2006.01)
*F02M 63/02* (2006.01)

(52) U.S. Cl.
CPC ......... *F02D 19/0694* (2013.01); *F02D 19/10* (2013.01); *F02M 37/0052* (2013.01); *F02M 43/02* (2013.01); *F02M 59/38* (2013.01); *F02M 63/0001* (2013.01); *F02M 63/0265* (2013.01); *Y02T 10/36* (2013.01)

(56) References Cited

U.S. PATENT DOCUMENTS

| | | | |
|---|---|---|---|
| 6,077,053 A | 6/2000 | Fujikawa et al. | |
| 6,439,192 B1 | 8/2002 | Ouellette et al. | |
| 6,761,325 B2 | 7/2004 | Baker et al. | |
| 7,293,418 B2 | 11/2007 | Noble et al. | |
| 7,527,482 B2 | 5/2009 | Ursan et al. | |
| 7,543,568 B1* | 6/2009 | Prior | F02M 57/026 123/456 |
| 7,726,283 B2* | 6/2010 | Vahle | F02M 63/027 123/446 |
| 7,832,374 B2* | 11/2010 | Verner | F02M 39/00 123/446 |
| 8,161,947 B2* | 4/2012 | Kuhnke | F02M 59/105 123/447 |
| 8,245,694 B2* | 8/2012 | Kuhnke | F02M 47/027 123/447 |
| 9,255,560 B2* | 2/2016 | McAlister | F02B 21/00 |
| 2005/0235962 A1* | 10/2005 | Freisinger | F02M 55/025 123/447 |
| 2006/0042597 A1* | 3/2006 | Magel | F02M 47/027 123/446 |
| 2008/0276628 A1* | 11/2008 | Lee | B63B 25/14 62/50.2 |
| 2015/0059687 A1* | 3/2015 | Glugla | F02D 41/3845 123/304 |

FOREIGN PATENT DOCUMENTS

WO 03046432 A1 6/2003
WO 2007014466 A1 2/2007

OTHER PUBLICATIONS

International Preliminary Report on Patentability and Written Opinion of the International Bureau issued on May 20, 2014, in connection with PCT/CA2012/050805.

* cited by examiner

METHOD AND APPARATUS FOR PUMPING FUEL TO A FUEL INJECTION SYSTEM

CROSS-REFERENCE TO RELATED APPLICATIONS

This application is a continuation of International Application No. PCT/CA2012/050805 having an international filing date of Nov. 14, 2012 entitled "Method And Apparatus For Pumping Fuel To A Fuel Injection System". The '805 international application claimed priority benefits, in turn, from Canadian Patent Application No. 2,758,246 filed on Nov. 16, 2011. The '805 international application is hereby incorporated by reference herein in its entirety.

FIELD OF THE INVENTION

The present invention relates to a method and apparatus for actuating a pump, such as a gas compressor or a liquid pump, using a diesel fuel pump. The compressor can be used to pressurize a gaseous fuel for a gaseous-fuel common rail in a dual-fuel or bi-fuel internal combustion engine.

BACKGROUND OF THE INVENTION

A dual fuel engine is defined herein to be an engine that can be fuelled with two different fuels at the same time, whereas a bi-fuel engine is defined herein to be an engine that can be fuelled with either one fuel or another fuel. It is possible for some engines to be operated as a dual fuel engine under some conditions and as a bi-fuel engine under other conditions. Due to several factors, engines fuelled with natural gas as a supplementary or alternative fuel in dual-fuel and bi-fuel engines are becoming more common. For example, recent advances in natural gas fuelling systems have allowed some dual-fuel engines that inject natural gas at high pressure directly into the combustion chamber to match the performance characteristics of diesel fuelled engines. Emission reductions obtained by substituting natural gas for diesel is allowing engine manufacturers to meet ever more stringent emission standards. Other factors include escalating diesel and gasoline fuel costs, and concerns over energy independence. As a result, many engine manufacturers are adapting directly injected, diesel cycle engines to substitute natural gas for diesel fuel.

Natural gas fuelling systems can store natural gas as either liquefied natural gas (LNG) or compressed natural gas (CNG). For vehicles, the use of LNG extends the driving range because the higher energy density allows more fuel to be stored in the same storage volume but also adds complexity to the fuel storage system, and so is used typically on larger vehicles that require extended operating range, such as commercial transport trucks. Regardless of the form in which natural gas is stored, at some point it is in a gaseous phase at low pressure and requires pressurization to the desired pressure for injection into combustion chambers through a fuel injector. A high pressure, gaseous fuel compressor is employed, such as the pump described in the applicant's own U.S. Pat. No. 7,527,482 (the '482 patent), to raise the pressure to the level required for gaseous fuel injection.

The compressor disclosed in the '482 patent is of the reciprocating piston-type. It comprises a hollow cylinder and a reciprocal free-floating piston disposed therein. The piston divides the cylinder into a compression chamber within which a gas can be introduced, compressed, and discharged; and a drive chamber, into which a hydraulic fluid can be introduced and removed for actuating the piston. The ratio of the area of a driving face of the piston on the driving chamber side to the area of a compression face of the piston on the compression chamber side is 1:1.

To run the compressor in preferred embodiments the hydraulic fluid is provided by a pre-existing hydraulic system on the engine that has enough capacity to additionally run the compressor. Vehicles typically have pre-existing hydraulic systems that include a hydraulic pump that is mechanically driven by attachment to a power take off which is ultimately driven by the engines crankshaft. However, with some engines there is not enough additional capacity in pre-existing hydraulic systems and either a higher capacity hydraulic pump must be installed or an additional hydraulic pump must be added if there is room for an additional power take-off. In some cases a reservoir needs to be added for the new or upgraded hydraulic pump, in addition to components for cooling the hydraulic fluid and for distributing the hydraulic fluid to the pump.

Modern day diesel cycle engines typically employ a liquid-fuel common rail direct injection system. Fuel pressure in a common rail is typically above 160 MPa, and advances in diesel system fuel technology allow pressures to reach as high as 200 MPa.

High injection pressures are required to atomize the diesel liquid fuel into tiny droplets as it is injected into the combustion chamber. Heat from hot compressed air then acts to vaporize the fuel from the surface of the droplets. The vapor is then ignited due to the heat of the compressed air, the droplets continue to vaporize from their surface and burn, getting smaller, until all the fuel from the droplet has been vaporized and burnt. Additionally, the injection pressure must be high enough to overcome in-cylinder pressures encountered when the fuel injector valves are actuated. The compression ratios are high for modern diesel cycle engines and typically can be in the range of 15:1 to 22:1. Normally, fuel injection begins at or near top dead center during the compression stroke, and can also occur in the power stroke. When fuel injection begins in-cy Under pressures before ignition can be at least as high as 4 MPa, and can quickly rise as combustion commences.

In order to achieve the desired injection pressures, a high-pressure diesel fuel pump is employed to raise the pressure of the diesel fuel to the common rail pressure. The term "common rail" describes an arrangement whereby all of the fuel injectors are supplied by a common fuel-rail which acts as a fuel distribution manifold and a pressure accumulator where the fuel is stored at high pressure. The common rail supplies multiple fuel injectors with high pressure fuel. This simplifies the design of the system and the high pressure pump since it only has to maintain a single commanded pressure at a target. Since diesel fuel is an incompressible fluid it can be brought to the required pressure quickly and with relatively little energy.

Diesel-cycle engines adapted for use with natural gas fuelling systems require an ignition source for the gaseous fuel. The natural gas auto-ignition temperature is approximately 580° C., which is significantly higher than the diesel fuel auto-ignition temperature of approximately 210° C. The maximum temperature of the compressed air charge inside a diesel-cycle engine with a compression ratio less than 22:1 is under 550° C. Diesel fuel can be employed as a pilot fuel wherein a small of amount of diesel is injected into the combustion chamber after the natural gas is injected in order to initiate combustion. The amount of diesel fuel that is consumed as a pilot fuel is typically less than 20% and in preferred embodiments averages less than about 5% of the total fuel consumed on an energy basis.

For engines and vehicles that do not have room for an additional power take off and for a dedicated hydraulic pump there is a need for a new and improved method and apparatus for actuating a liquid pump or gas compressor, used to pressurize a gaseous fuel for high pressure direct injection into the combustion chambers of a dual-fuel or bi-fuel engine.

SUMMARY OF THE INVENTION

An improved method pumps fuel to a fuel injection system in an internal combustion engine. The method comprises steps of pumping a liquid fuel to a first pressure; using the liquid fuel at the first pressure as a hydraulic fluid for driving a gaseous fuel pump; and pumping a gaseous fuel to a second pressure with the gaseous fuel pump. The liquid fuel is from a liquid fuel tank for the internal combustion engine, and can be diesel fuel, and the first pressure is at least a common rail pressure. The gaseous fuel can be natural gas. The method can further comprise a step of controlling the second pressure by varying the first pressure. The gaseous fuel pump can be driven hydraulically by directly using the liquid fuel at the first pressure, or can be driven mechanically or electrically by indirectly using the liquid fuel at the first pressure. The potential energy available in the liquid fuel at the first pressure is converted to any convenient form that can drive the gaseous fuel pump. The gaseous fuel pump can be a multi-stage pump. For the purpose of driving the gaseous fuel pump, the liquid fuel can be continuously flowed or pulsed. The gaseous fuel from the gaseous fuel pump can be delivered to a plurality of fuel injectors. The method can further comprise steps of delivering the liquid fuel at the first pressure to a fuel injection system; and injecting the liquid fuel into a combustion chamber of the internal combustion engine, or injecting the liquid fuel into an intake charge upstream of a cylinder in the internal combustion engine. The liquid fuel can be injected as a pilot fuel in the combustion chambers. The method can further comprise steps of delivering the gaseous fuel at the second pressure to a fuel injection system; and injecting the gaseous fuel into a combustion chamber of the internal combustion engine, or injecting the gaseous fuel into an intake charge upstream of a cylinder in the internal combustion engine. The step of pumping the gaseous fuel can comprise a sub-step of returning the liquid fuel upstream of the first pressure where the liquid fuel can be pumped to the first pressure yet again. The gaseous fuel can be in a liquefied state or a gaseous phase when being pumped. The gaseous fuel pump can be provided with a reduced flow requirement to match the capacity of a liquid fuel pump. The second pressure provided by the gaseous fuel pump is at least equal to an injection pressure for the gaseous fuel. In some embodiments the gaseous fuel at the second pressure can be further regulated to a third pressure suitable for use by fuel injectors that inject both the liquid fuel and the gaseous fuel into the combustion chamber. While pumping the gaseous fuel, the flow of the liquid fuel is controlled for a compression stroke and for an intake stroke of the gaseous fuel pump such that the flow of the liquid fuel is switched between the compression and intake strokes.

A fuel apparatus for an internal combustion engine comprises a liquid-fuel supply that is a source of a liquid fuel and a liquid fuel pump that receives the liquid fuel from the liquid fuel supply. The liquid fuel pump is operable to pressurize the liquid fuel to a first pressure. There is also a gaseous fuel supply that is a source of a gaseous fuel and a gaseous-fuel pumping system that receives the gaseous fuel from the gaseous fuel supply. The gaseous-fuel pumping system is responsive to the liquid fuel at the first pressure to pressurize the gaseous fuel to a second pressure. The liquid fuel at the first pressure acts as hydraulic fluid for the gaseous-fuel pumping system. A fuel-injection system receives the gaseous fuel at the second pressure and is operable to introduce the gaseous fuel into the internal combustion engine. An electronic controller is programmed to selectively actuate the gaseous-fuel pumping system to pressurize the gaseous fuel to the second pressure. The liquid fuel can be diesel fuel and the liquid-fuel pump can be a common rail pump. The common rail pump can be driven from a power take-off on the internal combustion engine. The gaseous fuel can be natural gas. The gaseous fuel can be in a liquefied state when being pumped, and in which case there is vaporizer downstream from the gaseous fuel pump. The gaseous fuel can also be in a gaseous phase when being pumped by the gaseous fuel pump, and in which case the gaseous fuel pump is also called a gas compressor. The fuel injection system can comprise a gaseous fuel injector that is disposed to introduce the gaseous fuel directly into a combustion chamber of the internal combustion engine. The gaseous fuel injector can also be disposed to introduce said gaseous fuel upstream of a cylinder in the internal combustion engine. There can be a liquid-fuel pressure regulator that receives the liquid fuel from the liquid-fuel pump and provides pressure regulated liquid-fuel to the fuel injection system. There can also be another liquid-fuel pressure regulator that receives the liquid fuel from the liquid-fuel pump and provides pressure regulated liquid-fuel to the gaseous-fuel pumping system. A return conduit connected with the gaseous-fuel pumping system and the liquid-fuel supply is operable to return the liquid fuel from the gaseous-fuel pumping system to the liquid-fuel supply. In some situations the return conduit can be connected with the gaseous-fuel pumping system and an upstream side of the liquid-fuel pump such that it can return the liquid fuel from the gaseous-fuel pumping system to the upstream side. The liquid fuel pressure at the upstream side of the liquid-fuel pump is normally higher than the liquid fuel pressure in the liquid fuel supply. Returning liquid fuel that was used as hydraulic fluid for the gaseous-fuel pumping system upstream of the liquid fuel pump saves energy by returning it to a higher pressure zone, since it requires less energy to pump the liquid fuel to the first pressure again. The liquid-fuel pump is driven by the internal combustion engine and can be connected with a power take-off on the internal combustion engine. The fuel injection system can also receive the liquid fuel at the first pressure. The fuel injection system can comprise an injector operable to receive the liquid fuel and the gaseous fuel and to inject the liquid fuel and the gaseous fuel independently and separately into the combustion chamber. The gaseous-fuel pumping system comprises a gaseous-fuel pump and a driving mechanism. The gaseous-fuel pump receives the gaseous fuel from the gaseous fuel supply. The driving mechanism is responsive to the liquid fuel at the first pressure to drive the gaseous-fuel pump to pressurize the gaseous fuel to the second pressure. The computer can be further programmed to control the driving mechanism to actuate the gaseous-fuel pump. The driving mechanism can comprise a hydraulic drive, a mechanical drive or an electric drive to drive said gaseous fuel pump. There is also a flow control device in the driving mechanism that is operable to switch the flow of the liquid fuel at the first pressure. The gaseous-fuel pump can be one of two gaseous-fuel pumps that operate in parallel and 180° out of phase with each other. The gaseous-fuel pumping system can further comprise a gaseous-fuel booster pump operating in series with the gaseous-fuel pump in a multi-stage arrangement. The gaseous-fuel pump can be a reciprocating piston-type pump, which can comprise a single-acting piston or a double-acting piston.

DETAILED DESCRIPTION OF PREFERRED EMBODIMENT(S)

Figure 1:
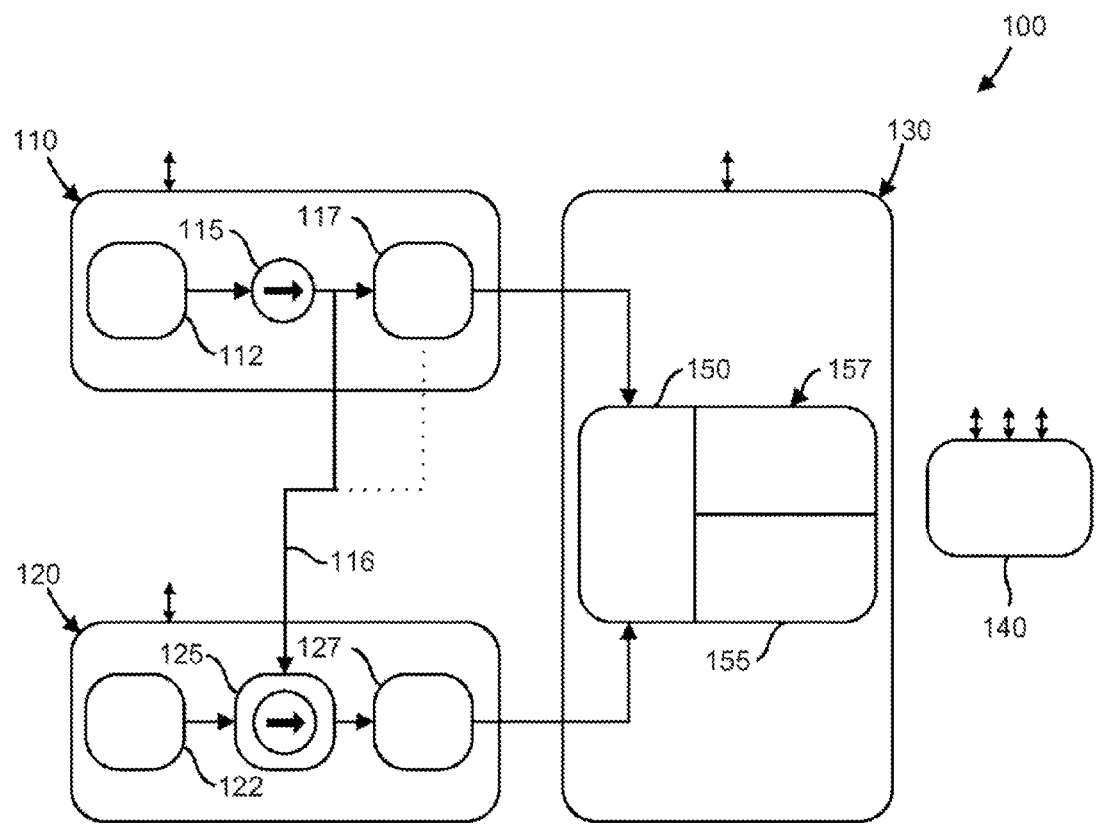
FIG. 1 is a schematic view of a first embodiment of a fuel apparatus.

Referring to the schematic view of FIG. 1, there is shown a first embodiment of fuel apparatus 100 comprising liquid fuel system 110, gaseous fuel system 120, internal combustion engine 130 and electronic controller 140. Liquid fuel system 110 comprises liquid fuel supply system 112, a liquid fuel pump 115 and liquid fuel delivery system 117. Liquid fuel supply system 112 provides a supply of liquid fuel, which can be diesel, bio-diesel, gasoline (petrol) and ethanol gasoline blends. Liquid fuel pump 115 is a common rail pump, such as a diesel common rail pump or a gasoline common rail pump. Pump 115 pressurizes liquid fuel received from supply system 112 to a first pressure suitable for fuel injection and provides it to engine 130 through delivery system 117. Gaseous fuel system 120 comprises gaseous fuel supply system 122, gaseous-fuel pumping system 125 and gaseous fuel delivery system 127. Gaseous fuel supply system 122 provides a supply of gaseous fuel. As used herein a gaseous fuel is defined as any fuel that is in a gaseous phase at standard temperature (20° C.) and pressure (1 atmosphere). By way of non-limiting examples, the gaseous fuels that are applicable to the present method and apparatus include natural gas, methane, ethane, propane, hydrocarbon derivatives, hydrogen and nitrogen. In addition, these fuels can be in a liquefied state, for example supply system 122 can provide LNG or liquefied propane gas (LPG) to pumping system 125. Pumping system 125 pressurizes the gaseous fuel received from supply system 122 to a second pressure suitable for fuel injection and provides it to engine 130 through delivery system 127. Pumping system 125 employs the liquid fuel at the first pressure received from pump 115 through conduit 116 as hydraulic fluid to pump the gaseous fuel to the second pressure, under control of electronic controller 140. Pumping system 125 comprises a gaseous fuel pump, which can be any type of pump suitable for pressurizing the gaseous fuel, and a driving mechanism that is responsive to the liquid fuel at the first pressure received from pump 115 to drive the gaseous fuel pump in system 125. The gaseous fuel pump in system 125 can be driven in any conventional manner by the driving mechanism to pressurize the gaseous fuel, for example hydraulically, mechanically, or electrically. The driving mechanism controls the flow of the liquid fuel at the first pressure to the gaseous fuel pump in system 125 when the gaseous fuel pump is driven hydraulically. When the gaseous fuel pump is driven mechanically, for example by a mechanical linkage or rotating shaft, or electrically, the driving mechanism converts the potential energy available in the liquid fuel at the first pressure to a form suitable for the gaseous fuel pump. In some applications liquid fuel pump 115 has excess capacity and it is advantageous to use pump 115 to supply the hydraulic fluid for driving the gaseous fuel pump of pumping system 125. For example when the liquid fuel is diesel which is used as a pilot fuel and the gaseous fuel is natural gas which is used as a main fuel, the percentage of pilot fuel consumed with respect to total fuel consumed on an energy basis is between 5 and 20% and typically between 5 and 10%. Similarly, when engine 130 is a dual fuel engine or a bi-fuel engine fuelling from gasoline and an alternative fuel, such as natural gas, the percentage of gasoline consumed with respect to total fuel consumed can vary between 0 and 100% depending upon the operating mode. In both of these situations pump 115 has excess capacity which can be used to assist with the pressurization of the gaseous fuel. Engine 130 comprises fuel injection system 150 in addition to one or more cylinders 155 and upstream components indicated generally by reference numeral 157. Upstream components 157 are components upstream from cylinders 55 and comprise, for example, an air intake manifold (not shown) operatively connected with cylinders 155, and in some embodiments a throttle body (not shown). Generally, cylinders 155 and upstream components 157 are representative of components where conventional fuel injectors introduce fuel into engine 130 for combustion in combustion chambers of cylinders 155. Fuel injection system 150 comprises one or more fuel injectors that, taken independently, can receive either the liquid fuel from fuel system 110 or the gaseous fuel from fuel system 120, or both of these fuels, and introduces the fuel received into cylinders 155 and/or upstream components 157. Fuel injection system 150 can be a direct injection system, where fuel is introduced directly into combustion chambers of cylinders 155, a single-point injection system, where the fuel is injected into an intake charge in the throttle body, a central-port injection (CPI) system, where fuel is introduced from a central location into an intake charge in each intake port upstream of cylinders 155 in the air intake manifold, a multi-point injection system, where each intake port is associated with a fuel injector that injects fuel into an intake charge in the intake port, or a combination of these systems. In the illustrative embodiments that show both liquid and gaseous fuel delivered to the fuel injectors, the fuel injectors are preferably of the type that can inject two different fuels separately and independently into the combustion chamber, such as the fuel injectors described in the applicant's own U.S. Pat. Nos. 6,439,192 and 6,761,325. Electronic controller 140 communicates with and commands liquid fuel system 110, gaseous fuel system 120 and fuel injection system 150 to deliver and inject fuel for combustion in cylinders 155. Signal wires represented by the symbols with double arrow heads such as those on the top side of electronic controller 140, transmit measured parameters and send command signals for controlling the operation of individual components. In the present example electronic controller 140 is a computer comprising a processor and memories, including a permanent memory, such as FLASH or EEPROM, and a temporary memory, such as SRAM or DRAM, for storing and executing a program. In another preferred embodiment electronic controller 140 is an engine control unit (ECU) of engine 130. Fuel apparatus 100 can be for any dual-fuel or bi-fuel engine, and as non-limiting examples can be employed in motor vehicles, locomotives, mine haul trucks, airplanes and power generation or other stationary equipment.

Figure 2:
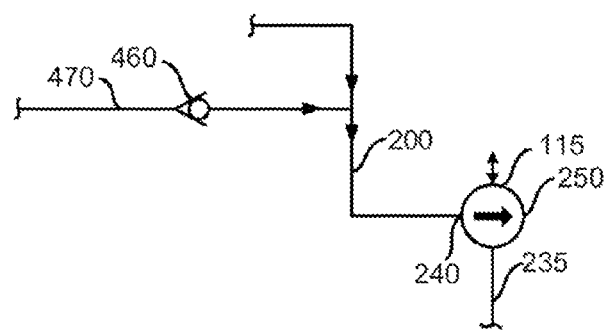
FIG. 2 is a schematic view of a second embodiment of the fuel apparatus.

Referring now to the schematic view of FIG. 2, there is shown a second embodiment which is similar to the previous embodiment and like parts have like reference numerals and are not described in detail, if at all. Generally, fuel apparatus 100 can be divided between on-engine components and off-engine components as indicated generally by demarcation line 105, where components to the left of line 105 are off-engine and those to the right are on-engine. Certain components can be located either on-engine or off-engine, and the embodiments herein described in no way limit the location of such components. Liquid fuel system 110 comprises liquid fuel tank 160 that holds the liquid fuel. Tank pump 180 operates to pump liquid fuel through one-way check valve 190 into supply conduit 200. In other embodiments pump 180 can be located outside of tank 160. One-way check valve 190 prevents the liquid fuel from returning to tank 160, typically when pump 180 is off, due to gravity or other forces, for example when fuel apparatus 100 is in a motor vehicle such other forces include those forces introduced by the motion of the vehicle. It is possible that in other embodiments check valve 190 is integrated into pump 180. Liquid-fuel pump 115 is a common rail pump and increases the pressure of the liquid fuel to a pressure suitable for fuel injection system 150, as will be described in more detail below. Pump 115 comprises suction inlet port 240 that draws in the liquid fuel from conduit 200 and outlet port 250 that provides pressurized liquid fuel to pressure regulator 280. Pump 115 can be mechanically driven from a power take-off from engine 130, as indicated schematically by reference numeral 235, or driven from a hydraulic system (not shown) or electric motor (not shown) of engine 130. The pumping action of pump 115 elevates the temperature of the liquid fuel. Pressure regulator 280 is operable to regulate the pressure of the liquid fuel from pump 115 such that the pressure within liquid-fuel common rail 290 is stable and suitable for fuel injection system 150. In other embodiments an inlet metering valve (not shown) that is controlled by electronic controller 140 and located between conduit 200 and inlet valve 240 can regulate the pressure of the liquid fuel in conduit 460. Pressurized liquid fuel is communicated from regulator 280 through fuel conditioning module 285 to common rail 290. The function of fuel conditioning module 285 is to regulate the differential pressure between the liquid fuel and the gaseous fuel, as will be described in further detail below, such that pressure of the liquid fuel from regulator 280 is substantially the same as the pressure of the liquid fuel in common rail 290. Electronic controller 140 is responsive to pressure sensor 300, which is operable to measure the pressure of the liquid fuel in common rail 290, in order to control pump 115 and regulator 280 to maintain a suitable pressure of the liquid fuel in rail 290.

Gaseous fuel supply system 120 comprises gaseous fuel vessel 310 that provides the gaseous fuel to pumping system 125. In the shown embodiment vessel 310 holds the gaseous fuel in a gaseous phase under pressure, in accordance with regulations governing pressurized tanks in the jurisdiction of operation. When vessel 310 holds compressed natural gas it can typically be held under pressure up to 70 MPa, and as fuel is consumed by engine 130 the pressure drops. In other examples it is possible that vessel 310 is a cryogenic vessel holding LNG or LPG. In these situations vessel 310 can comprise a liquid fuel pump (not shown), such as that described in the applicant's own U.S. Pat. No. 7,293,418, that operates to pump LNG or LPG from vessel 310 and to deliver it in a gaseous phase to gaseous-fuel common rail 410. In the illustrated embodiment, compressor 320 is a reciprocating piston-type pump, such as that described in the aforementioned '482 patent, and operates to elevate the pressure of the gaseous fuel to a pressure suitable for one or more fuel injectors 500 in fuel injection system 150. As used herein the term pump refers to a pump or a compressor for elevating the pressure of a fluid that can be in a liquid phase, a gaseous phase or a multi-phase. Compressor 320 comprises inlet port 330, outlet port 340 and hydraulic port 350. Flow switching device 360 operates to control the flow of hydraulic fluid with respect to compressor 320 between a compression stroke and an intake stroke, which will be described in further detail below. The gaseous fuel from outlet port 340 is communicated through heat exchanger 370 to lower the elevated temperature of the gaseous fuel, due to compression, in order to prevent negative combustion effects in engine 130. Accumulator 390 provides a reservoir of gaseous fuel at the desired pressure to reduce pressure fluctuations caused by compressor 320 (or by an LNG pump) and to avoid sudden drops in pressure, for example when there is a sudden high demand for fuel. However, in other embodiments it is possible that conduit 395 provides sufficient storage of the gaseous fuel and accumulator 390 is not required. Solenoid valve 380 is operable under command of electronic controller 140 to interrupt the flow of the gaseous fuel between compressor 320 and conduit 395, for example in response to a measurement of pressure from sensor 400. The gaseous fuel is communicated from conduit 395 through fuel conditioning module 285 to gaseous-fuel common rail 410, which supplies gaseous fuel to fuel injection system 150 for injection into respective combustion chambers of engine 130. Fuel conditioning module 285 is operable to regulate the pressure of the gaseous fuel to be within a predetermined range of the liquid fuel so that the differential fuel pressures within fuel injectors 500 is within the predetermined range. Pressure signals from pressure sensor 305, which measures the pressure of the gaseous fuel in common rail 410, and pressure sensor 300 are received by electronic controller 140 to maintain the differential fuel pressure. In other embodiments fuel conditioning module 285 may not be required since pump 115 controls the pressure in both the liquid-fuel common rail 290 and the gaseous-fuel common rail 410, and by appropriately selecting and controlling the components in fuel apparatus 100 the differential pressure in common rails 290 and 410 can be controlled. In still further embodiments fuel injectors 500 may not have a requirement to keep the differential pressure between the liquid fuel and the gaseous fuel to within a predetermined range and in such embodiments fuel conditioning module 285 is not required. Electronic controller 140 maintains the pressure within conduit 395 between a low and high set point by commanding compressor 320, flow switching device 360, and valve 380 accordingly.

Figure 3:
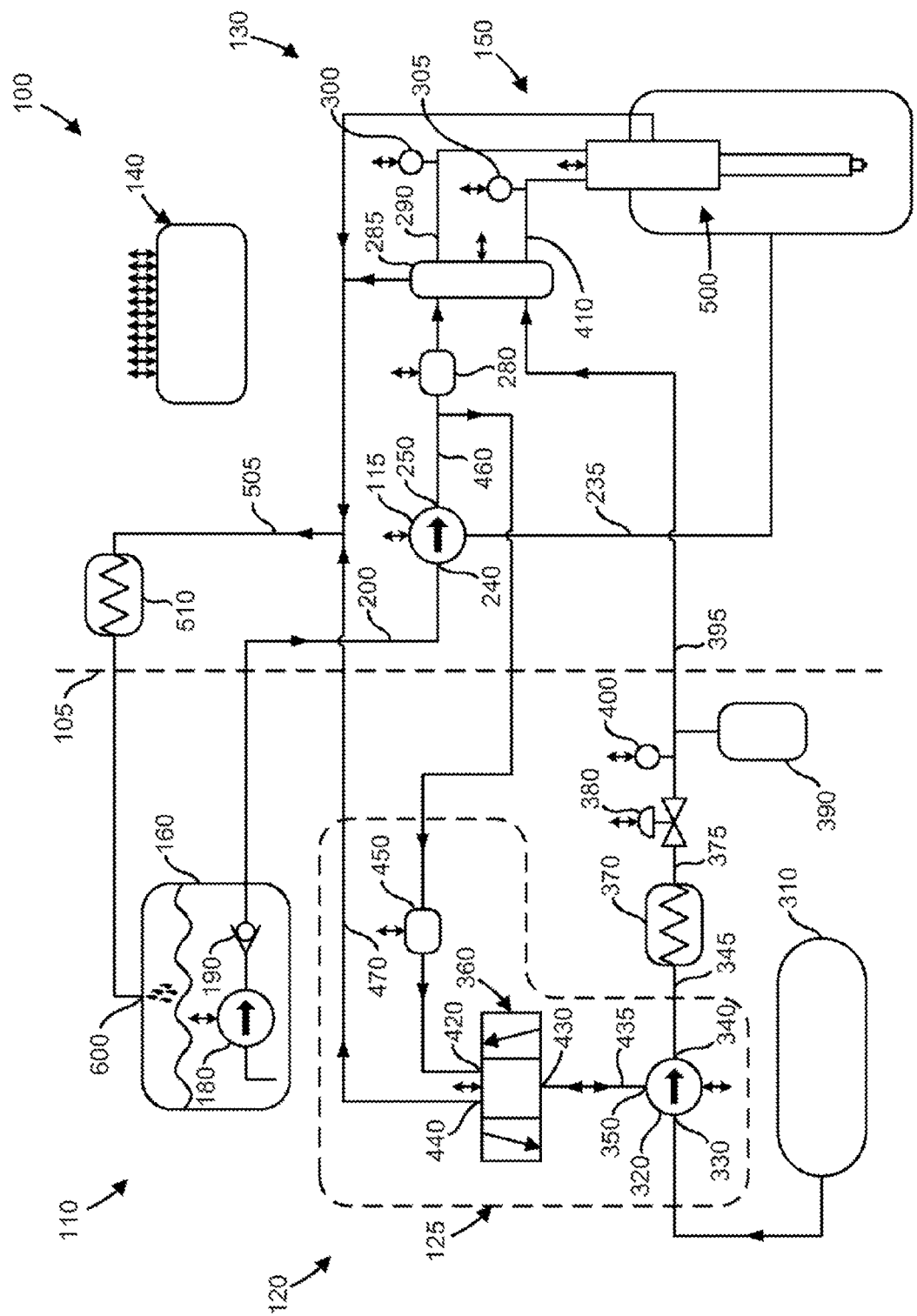
FIG. 3 is a partial schematic view of an alternative to the second embodiment.

Returning to flow switching device 360, its operation is now described. During the compression stroke of compressor 320, flow switching device 360 receives the liquid fuel from pressure regulator 450 at inlet port 420 and directs the liquid fuel to port 430 where it is then applied to hydraulic port 350 of compressor 320. The liquid fuel enters hydraulic port 350 and operates to move a piston within compressor 320 to compress the gaseous fuel within a compression chamber. The piston in compressor 320 is a single-acting piston in the present example whereby the liquid fuel acts only on one face of the piston. A pulsed flow of the liquid fuel from liquid-fuel pump 115 is required for compressor 320 due to the single-acting piston. Pressure regulator 280 assists in filtering pressure fluctuations due to this pulsed flow, or non-continuous flow requirements of compressor 320. It is noteworthy to mention that in embodiments where the flow requirement of the liquid fuel supplied to compressor 320 is substantially constant and pump 115 can maintain a stable pressure in conduit 460 then pressure regulator 280 can be considered optional. Compressor 320 can comprise two cylinders that are operating in parallel and 180° out of phase with each other so that one cylinder is being filled with a gaseous fuel while the other cylinder is compressing the gaseous fuel, and the operation of said compressor is described in more detail in the '482 patent. Compressor 320 effectively operates as two pumps when it comprises two cylinders operating in parallel and 180° out of phase with each other. A substantially continuous flow of the liquid fuel from pump 115 results when compressor 320 comprises two cylinders, or a double acting piston. Pressure regulator 450 receives the liquid fuel from conduit 460 and controls the pressure of the liquid fuel provided to compressor 320 relative to the pressure of the liquid fuel in conduit 460 that is independent of the pressure of the liquid fuel received in common rail 290, such that the piston velocity and temperature of compressor 320 can be controlled. Pressure regulator 450 can be a single step, a multi-step or a variable pressure regulator depending upon system requirements. Electronic controller 140 commands pressure regulator 450 to adjust the pressure of the liquid fuel entering inlet port 420. Electronic controller 140 can additionally adjust the pressure of the liquid fuel entering inlet port 420 by commanding pump 115 to vary the output pressure of the liquid fuel at outlet port 250, and in alternative embodiments pressure regulator 450 is not required if pump 115 can adequately control the pressure for compressor 320. At the end of the compression stroke of compressor 320, electronic controller 140 commands flow switching device 360 to switch the flow path of the liquid fuel from between ports 420 and 430 to port 430 and outlet port 440 to begin the intake stroke. The liquid fuel at hydraulic port 350 of compressor 320 is at a pressure higher than the pressure in tank 160 and liquid fuel flows out of port 350 through ports 430 and 440 and conduit 470 to conduit 505 where the liquid fuel is returned to tank 160 through return port 600. The gaseous fuel entering inlet port 330 of compressor 320 is also at a pressure higher than the pressure in tank 160, and moves the piston in compressor 320 so that substantially all the liquid fuel in compressor 320 is drained out of hydraulic port 350. With reference to FIG. 3, in alternative embodiments the liquid fuel in conduit 470 can be returned through check-valve 460 to conduit 200 upstream of pump 115. When compressor 320 is a single acting piston, that is hydraulic fluid acts only on one side of the piston in compressor 320, the gaseous fuel pressure in vessel 310 should be greater than the liquid fuel pressure in conduit 200 such that a pressure differential exists across the piston in compressor 320 during the intake stroke and the piston moves taking in new gaseous fuel and expelling the liquid fuel to conduit 470. This alternative is advantageous since the liquid fuel is returned to a higher pressure zone compared to tank 160 and less energy is wasted in pumping the liquid fuel with pump 115 and then returning the liquid fuel from compressor 320 to a lower pressure. Check-valve 460 helps to manage back-pressure due to tank pump 180 and can be considered optional.

Returning again to FIG. 2, fuel injection system 150 comprises fuel injectors 500 which are dual-fuel injectors in the present example. Liquid-fuel common rail 290 provides the liquid fuel at liquid-fuel injection pressure to injectors 500, and gaseous-fuel common rail 410 provides the gaseous fuel at gaseous-fuel injection pressure to injectors 500. Electronic controller 140 commands injectors 500 to inject the liquid fuel and the gaseous fuel independently and separately of each other by actuating respective valve members therein. Each of the fuel injectors 500 communicates with return conduit 505 to return liquid fuel not used in combustion through return port 600 to liquid fuel tank 160. Fuel conditioning module 285 also communicates with return conduit 505 to return liquid fuel when common rail 290 is at full capacity. During normal operation of fuel apparatus 100 there may be operating modes of engine 130 in which heated liquid fuel is returned to tank 160 through return conduit 505, such that the liquid fuel in tank 160 obtains an elevated temperature, in which case heat exchanger 510 can be advantageous to reduce the temperature. In the present example, the liquid fuel is diesel fuel and the gaseous fuel is natural gas, and fuel injectors 500 injectors inject diesel as a pilot fuel and natural gas as a main fuel.

Figure 4:
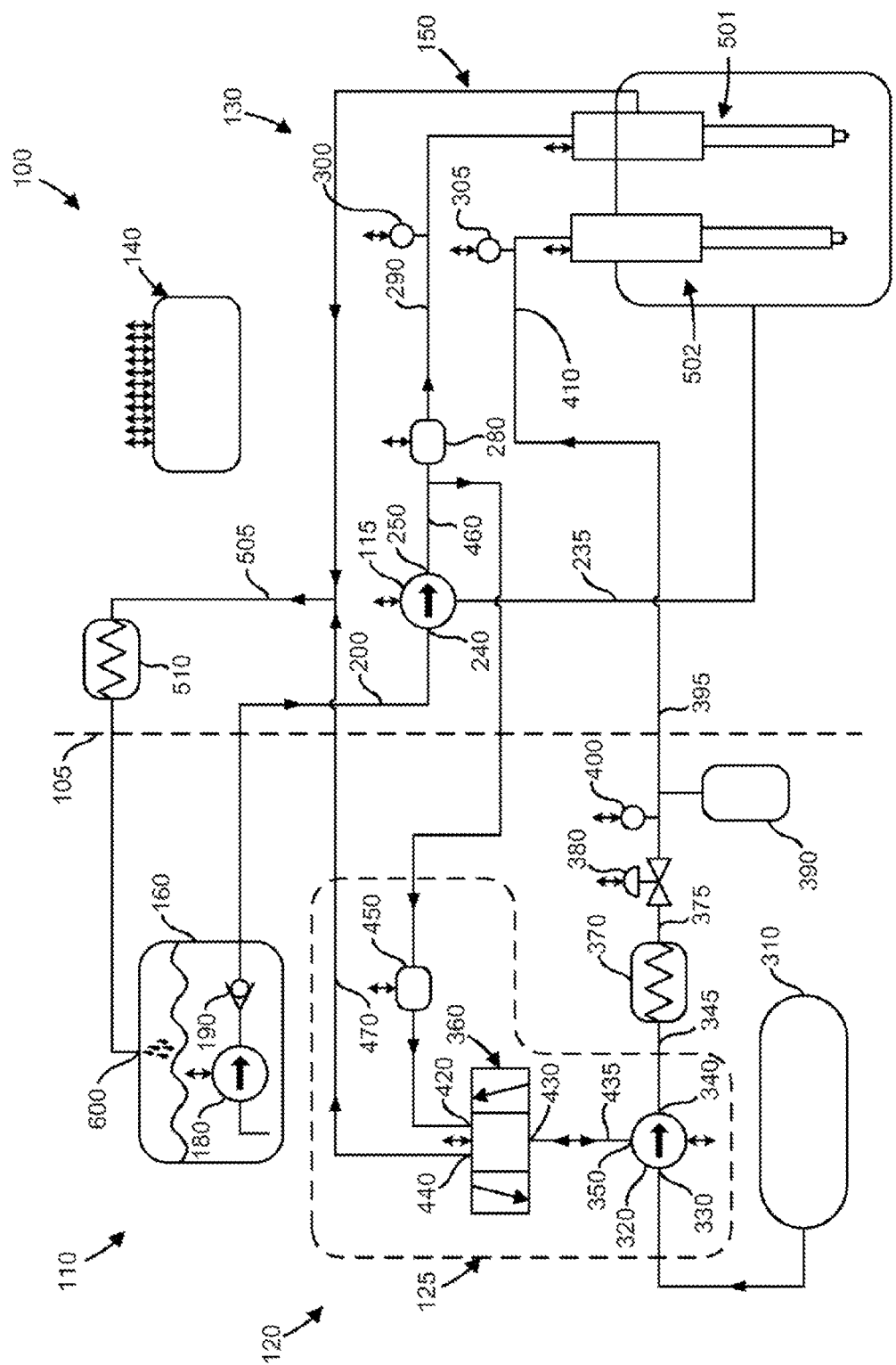
FIG. 4 is a schematic view of a third embodiment of the fuel apparatus.

Referring now to the schematic view of FIG. 4, there is shown a third embodiment which is similar to the embodiment of FIG. 2 and like parts have like reference numerals and are not described in detail, if at all. Fuel injection system 150 comprises one or more liquid fuel injectors 501 and one or more gaseous fuel injectors 502. Liquid-fuel common rail 290 provides pressurized liquid fuel to liquid fuel injectors 501, and gaseous-fuel common rail 410 provides pressurized gaseous fuel to gaseous fuel injectors 502. Electronic controller 140 commands injector 501 to inject the liquid fuel and commands injector 502 to inject the gaseous fuel by actuating valve members therein. Fuel conditioning module 285, as seen in FIG. 2, is not required in this embodiment since there are separate gaseous fuel and liquid fuel injectors, and the differential pressure between the two fuels is not an issue with regard to injectors 501 and 502. In other embodiments, injectors 501 and 502 can be assembled together into one common part such that there are still separate injectors 501 and 502 but one assembled part. This is in contrast to injectors 500 of FIGS. 1 and 2 where mechanisms within injectors 500 for the gaseous fuel and the liquid fuel are inter-related.

Figure 5:
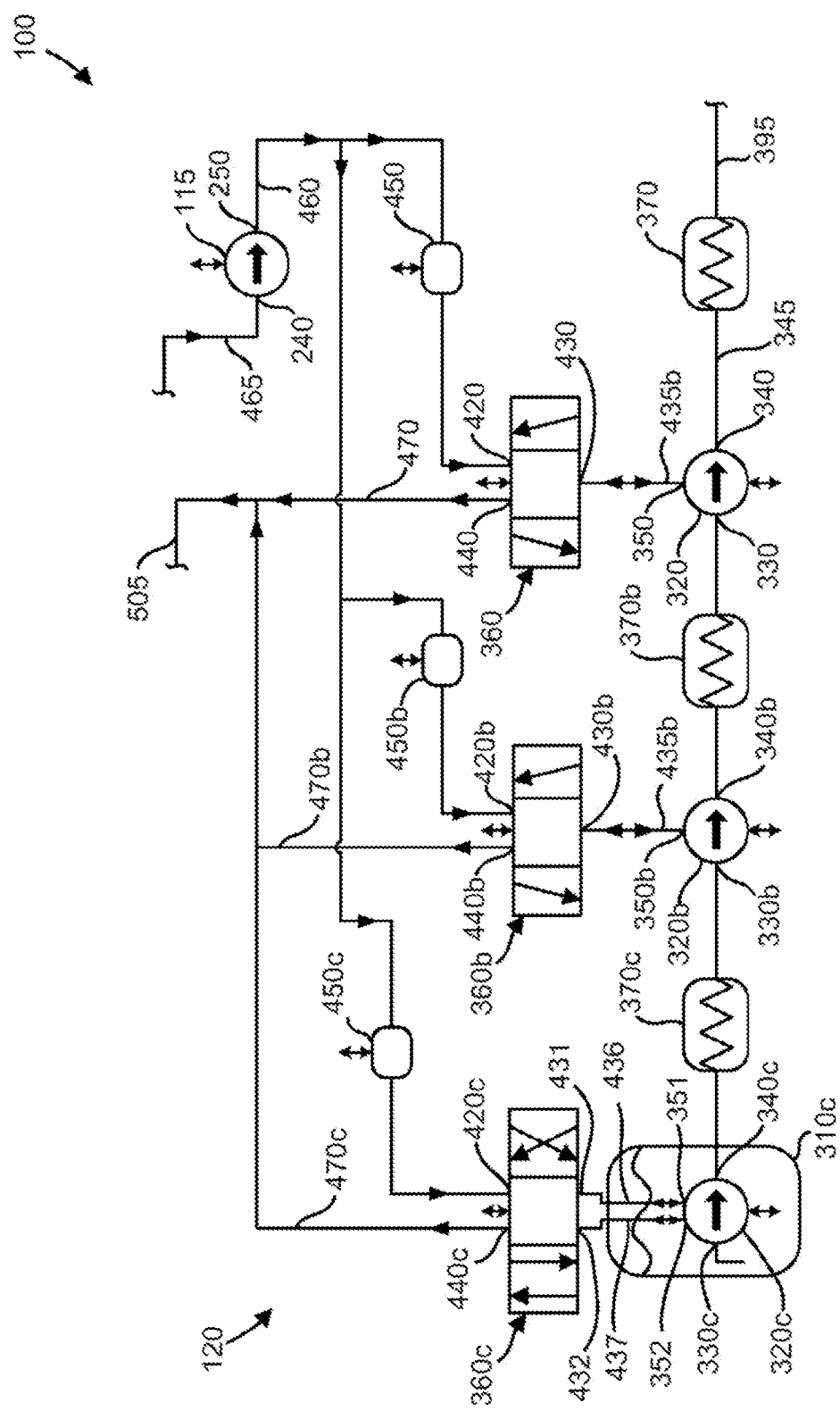
FIG. 5 is a partial schematic view of a fourth embodiment of the fuel apparatus.

With reference to the partial schematic view of FIG. 5, there is shown a fourth embodiment of fuel apparatus 100 that is similar to the embodiments of FIGS. 1, 2 and 4 and like parts have like reference numerals and are not described in detail, if at all. Fuel apparatus 100 as shown in FIG. 5 does not include all the components shown in FIGS. 1, 2 and 4 for clarity purposes, and it is understood that these components and alternatives previously discussed can be included in fuel apparatus 100 in FIG. 5. Fuel apparatus 100 comprises a multi-stage pump arrangement comprising compressors 320 and 320*b*, and pump 320*c*. Cryogenic vessel 310*c* holds a cryogenic fluid, such LNG or LPG. Cryogenic liquid fuel pump 320*c* is a double acting, reciprocating piston-type pump that comprises an integrated heat vaporizer, similar to that disclosed in the aforementioned '418 patent, however in other embodiments other types of liquid pumps can be employed and the heat vaporizer can be a separate component downstream from pump 320*c*. Pump 320*c* is integrated into a coupling (not shown) disposed in a wall of vessel 310c, as shown in the '418 patent, and comprises inlet port 330c, outlet port 340c and hydraulic ports 351 and 352. Pump 320c operates to pump LNG or LPG from vessel 310c and to deliver it in a gaseous phase to compressor 320b through heat exchanger 370c. Flow switching device 360c comprises inlet port 420c, outlet port 440c and switchable ports 431, 432, and is operable to direct the liquid fuel from optional pressure regulator 450c to and from pump 320c. During an intake stroke of pump 320c, also known as a retraction stroke, pressurized liquid fuel is communicated through inlet port 420c to port 431 and into port 351 of pump 320c where it drives a reciprocating piston therein, the action of which forces liquid fuel out of port 352 and through ports 432 and 440c into conduit 470c. During a compression stroke of pump 320c, also known as an extension stroke, pressurized liquid fuel is communicated through inlet port 420c to port 432 and into port 352 of pump 320c where it drives the reciprocating piston therein, the action of which forces liquid fuel out of port 351 and through ports 431 and 440c into conduit 470c. Electronic controller 140 commands flow switching device 360c to switch the flow path of the liquid fuel between the compression and intake strokes. The piston in pump 320c is a double-acting piston in the present example whereby the liquid fuel acts on one face of the piston during the intake stroke and on the opposite face of the piston during the compression stroke. The liquid fuel flows substantially continuously from liquid-fuel pump 115 due to the double-acting piston in pump 320c. Compressor 320b is a booster pump operable to receive gaseous fuel from pump 320c and to elevate the pressure of the gaseous fuel to a level within the operating range of suction inlet 330 of compressor 320. If required heat exchanger 370b lowers the temperature of the gaseous fuel after being pumped by compressor 320b. In other embodiments it is possible that the pressure of the gaseous fuel from pump 330c is within the operating range of suction inlet 330 and compressor 320b is not required. Similarly, in other embodiments compressor 320c may elevate the pressure of the gaseous fuel to a level within the operating range of fuel conditioning module 285, if present, and compressor 320 is additionally not required. In still further embodiments compressor 320b can be a vane-type pump. Flow switching device 360b operates in a similar manner to flow switching device 360 described previously with reference to FIGS. 2 and 4. Pressure regulators 450b and 450c, which are optional depending upon system requirements, operate to regulate the pressure of liquid fuel received from pump 115 and supplied to flow switching devices 360b and 360c respectively, and can be single step-type, multi-step-type or variable-type pressure regulators. Electronic controller 140 as seen in FIGS. 1, 2 and 4 commands compressor 320b, pump 320c, flow switching devices 360b and 360c and pressure regulators 450b and 450c accordingly.

Figure 6:
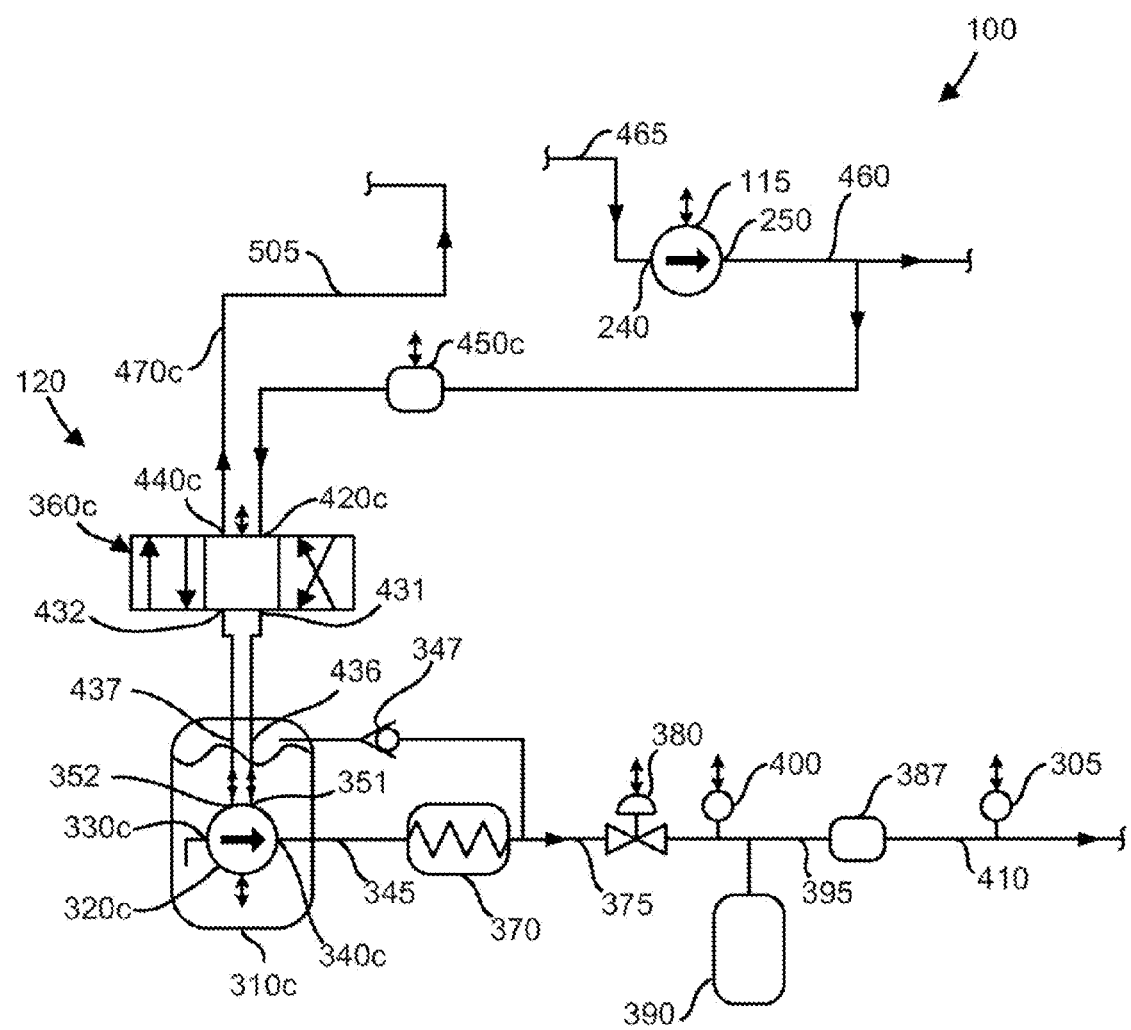
FIG. 6 is a partial schematic view of a fifth embodiment of the fuel apparatus.

Referring to FIG. 6, there is shown a partial schematic view of a fifth embodiment of fuel apparatus 100 that is similar to the embodiments of FIGS. 1, 2, 4 and 5 and like parts have like reference numerals and are not described in detail, if at all. Fuel apparatus 100 as shown in FIG. 6 does not include all the components shown in FIGS. 1, 2, 4 and 5 for clarity purposes, and it is understood that these components and alternatives previously discussed can be included in fuel apparatus 100 in FIG. 6. Conduit 345 connects port 340c of liquid-fuel pump 320c with heat exchanger 370, and conduit 375 connects heat exchanger 370 with solenoid valve 380. One-way check valve 347 allows vapor within vessel 310c, which builds up over time due to boiling of liquefied fuel therein, to flow towards valve 380 for distribution in common rail 410. Pressure-regulator 387 provides a stable pressure of the gaseous fuel in common rail 410 since the pressure of the gaseous fuel within conduit 375 and accumulator 390 can increase above the specified injection pressures depending on engine operating conditions, for example when not enough fuel is consumed by engine 130 and vapor from boiling continues to accumulate in accumulator 390. Pressure sensor 305 functions to measure the pressure in common rail 410 after pressure regulator 387. Vessel 310c further comprises a pressure relief valve (not shown) that vents vapor within vessel 310c as soon as the vapor pressure therein reaches a predetermined value.

Figure 7:
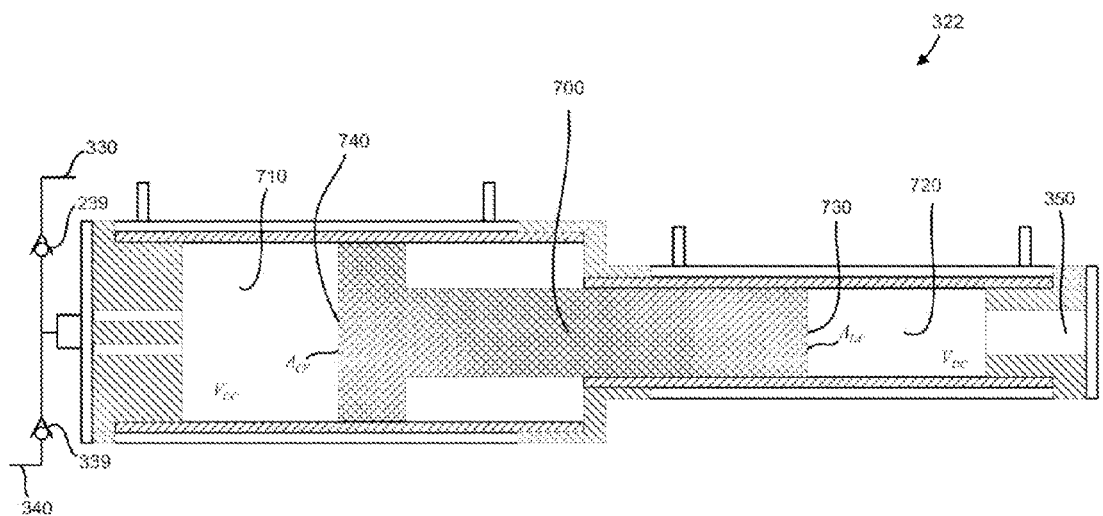
FIG. 7 is a sectional plan view of a first embodiment of a gaseous-fuel compressor that can be used in the embodiments of FIGS. 1, 2, 4, 5 and 6.
Figure 8:
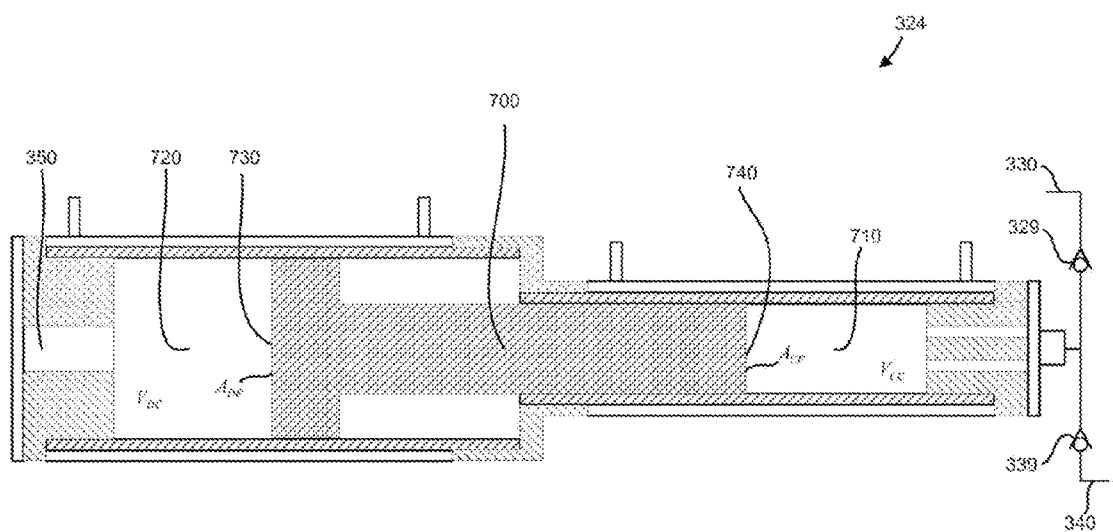
FIG. 8 is a sectional plan view of a second embodiment of a gaseous-fuel compressor that can be used in the embodiments of FIGS. 1, 2, 4, 5 and 6.

Referring to the sectional plan views of FIGS. 7 and 8, alternative embodiments of compressor 320 are now described. Compressors 322 and 324 operate on the same principle as the free-floating piston compressor disclosed in the aforementioned '482 patent and generally only differences are discussed. It is understood that other types of pumps other than compressors 320, 322 and 324 can be employed in gaseous-fuel pumping system 125 shown in FIG. 1, and the following descriptions of free-floating piston-type compressors in no way limits the types of pumps that can be employed. In some applications the capacity of liquid fuel pump 115 as seen in FIGS. 1 to 6 may not be sufficient to meet the flow requirements of compressor 320 for pressurized liquid fuel. In these situations it is advantageous to employ reciprocating piston-type compressor 322 as illustrated in FIG. 7. Compressor 322 comprises piston 700, compression chamber 710 and driving chamber 720. Piston 700 comprises driving face 730 and compression face 740. The ratio of area $A_{DF}$ of driving face 730 to area $A_{CF}$ of compression face 740 is less than one by design. Maximum volume $V_{DC,Max}$ of driving chamber 720 is defined as volume $V_{DC}$ at the end of the compression stroke. Maximum volume $V_{CC,Max}$ of the compression chamber is defined as volume $V_{CC}$ at the end of the intake stroke. The ratio $A_{DF}/A_{CF}$ of less than one results in maximum volume $V_{DC,Max}$ of driving chamber 720 being less than the maximum volume $V_{CC,Max}$ of compression chamber 710. This is in contrast to the compressor disclosed in the '482 patent where the maximum volumes of both chambers are substantially equal. By decreasing maximum volume $V_{DC,Max}$ of driving chamber 720 the flow capacity requirement for pump 115 is decreased since it then needs to fill a smaller volume for each cycle of compressor 322. The force acting on driving face 730 is defined as pressure $P_{DF}$ of fluid pushing against face 730 multiplied by area $A_{DP}$ of face 730, and is represented by Eq. 1 below. The force acting on compression face 740 is defined as pressure $P_{CF}$ of compressed fluid pushing against face 740 multiplied by area $A_{CF}$ of face 740, and is represented by Eq. 2 below. There is a force balance at the end of the compression stroke, when compressor 322 obtains full compressive output capacity after operating for some time, where piston 700 is stationary and the force on driving face 730 equals the force on compression face 740, as defined by Eq. 3 and 4. The pressure in compression chamber 710 and at outlet port 340 in this circumstance can be determined by solving Eq. 4 for $P_{CF}$ yielding Eq. 5. As can be seen by Eq. 5, when reducing area $A_{DP}$ to meet the flow capacity of pump 115, pressure $P_{CF}$ at outlet port 340 decreases. Therefore in order to maintain the same pressure at outlet port 340 pressure $P_{DF}$ must be increased. Pump 115 can be commanded by electronic controller 140 to provide pressurized liquid fuel to compressor 322 having sufficient pressure $P_{DF}$ such that piston 700 compresses the gaseous fuel in compression chamber 710 to sufficient pressure $P_{CF}$.

$$F_{DF} = P_{DF} A_{DF} \quad \text{Eq. 1}$$

$$F_{CF} = P_{CF} A_{CF} \quad \text{Eq. 2}$$

$$F_{DF} = F_{CF} \quad \text{Eq. 3}$$

$$P_{DF} A_{DF} = P_{CF} A_{CF} \quad \text{Eq. 4}$$

$$P_{CF} = P_{DF} \frac{A_{DF}}{A_{CF}} \quad \text{Eq. 5}$$

Referring now to FIG. 8, compressor 324 is now described. In some applications the pressure of the liquid fuel from liquid fuel pump 115, as seen in FIGS. 1 to 6, may not be sufficient to meet the requirements of compressor 320. In these situations it may be advantageous to employ reciprocating piston-type compressor 324. Compressor 324 comprises piston 700, compression chamber 710 and driving chamber 720. Piston 700 comprises driving face 730 and compression face 740. The ratio of area ADF of driving face 730 to area ACF of compression face 740 is greater than one, by design, in order to multiply the pressure PDP of the liquid fuel acting on driving face 730 in order to compress the gaseous fuel in compression chamber 710 to a sufficient pressure, as can be seen by Eq. 5, when the compression stroke has completed. In this arrangement, piston 700, driving chamber 720 and compression chamber 710 are acting as an intensifier.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of pumping fuel to a fuel injection system in an internal combustion engine comprising:
    (a) pumping a liquid fuel to a first pressure;
    (b) using the liquid fuel at the first pressure as a hydraulic fluid for driving a gaseous fuel pump; and
    (c) pumping a gaseous fuel to a second pressure with the gaseous fuel pump.

2. The method of claim 1, wherein the liquid fuel is diesel fuel, and said first pressure is a common rail pressure.

3. The method of claim 1, wherein the gaseous fuel is natural gas.

4. The method of claim 1, further comprising:
    (d) controlling the second pressure by varying the first pressure.

5. The method of claim 1, wherein the step of driving the gaseous fuel pump comprises a sub-step of hydraulically driving the gaseous fuel pump using the liquid fuel at the first pressure.

6. The method of claim 1, wherein the step of driving the gaseous fuel pump comprises a sub-step of mechanically driving the gaseous fuel pump using the liquid fuel at the first pressure.

7. The method of claim 1, wherein the step of driving the gaseous fuel pump comprises a sub-step of electrically driving the gaseous fuel pump using the liquid fuel at the first pressure.

8. The method of claim 1, further comprising:
    (d) delivering said gaseous fuel from said gaseous fuel pump to a plurality of fuel injectors.

9. The method of claim 1, further comprising:
    (d) delivering the liquid fuel at the first pressure to a fuel injection system; and
    (e) injecting said liquid fuel into a combustion chamber of the internal combustion engine.

10. The method of claim 9, wherein the liquid fuel is diesel fuel, and the step of injecting comprises using the diesel fuel as a pilot fuel in the combustion chamber.

11. The method of claim 1, further comprising:
    (d) delivering the liquid fuel at the first pressure to a fuel injection system; and
    (e) injecting said liquid fuel into an intake charge upstream of a cylinder in the internal combustion engine.

12. The method of claim 1, further comprising:
    (d) delivering the gaseous fuel at the second pressure to a fuel injection system; and
    (e) injecting said gaseous fuel into a combustion chamber of the internal combustion engine.

13. The method of claim 1, comprising further steps of:
    (d) delivering the gaseous fuel at the second pressure to a fuel injection system; and
    (e) injecting said gaseous fuel into an intake charge upstream of a cylinder in the internal combustion engine.

14. The method of claim 1, wherein the step of pumping the gaseous fuel comprises a sub-step of returning the liquid fuel upstream of the first pressure wherein said liquid fuel can be pumped to the first pressure again.

15. The method of claim 1, wherein the gaseous fuel is in a liquefied state when being pumped by said gaseous fuel pump.

16. The method of claim 1, wherein the second pressure is equal to or greater than a pressure suitable for injecting said gaseous fuel into a combustion chamber of the internal combustion engine.

17. The method of claim 1, further comprising:
    (d) taking said gaseous fuel at said second pressure and then regulating to a third pressure.

18. The method of claim 1, wherein the step of pumping comprises a step of controlling flow of the liquid fuel for a compression stroke and for an intake stroke of the gaseous fuel pump.

19. The method of claim 18, wherein the step of controlling comprises a step of switching the flow of the liquid fuel between the compression stroke and the intake stroke.

20. The method of claim 1, wherein the step of driving the gaseous fuel pump comprises a sub-step of converting energy available in the liquid fuel at the first pressure to a form suitable for driving the gaseous fuel pump.

21. A fuel apparatus for an internal combustion engine comprising:
    (a) a liquid-fuel supply being a source of a liquid fuel;
    (b) a liquid-fuel pump receiving said liquid fuel from the liquid-fuel supply and being operable to pressurize the liquid fuel to a first pressure;
    (c) a gaseous-fuel supply being a source of a gaseous fuel;
    (d) a gaseous-fuel pumping system receiving said gaseous fuel from the gaseous-fuel supply and being responsive to said liquid fuel at the first pressure to pressurize the gaseous fuel to a second pressure, the liquid fuel at the first pressure acting as hydraulic fluid for said gaseous-fuel pumping system;

(e) a fuel injection system receiving the gaseous fuel at the second pressure and being operable to introduce said gaseous fuel into the internal combustion engine; and (f) an electronic controller programmed to selectively actuate the gaseous-fuel pumping system to pressurize said gaseous fuel to the second pressure.

22. The apparatus of claim 21, wherein the liquid fuel is diesel and the liquid-fuel pump is a common rail pump.

23. The apparatus of claim 21, wherein the gaseous fuel is natural gas.

24. The apparatus of claim 21, wherein the gaseous fuel is in a liquefied state when being pressurized by said gaseous-fuel pumping system.

25. The apparatus of claim 21, wherein the gaseous fuel is in a gaseous phase when being pressurized by said gaseous-fuel pumping system.

26. The apparatus of claim 21, wherein the electronic controller is further programmed to control the second pressure by varying the first pressure of the liquid-fuel.

27. The apparatus of claim 21, wherein the fuel injection system comprises a gaseous fuel injector being disposed to introduce said gaseous fuel directly into a combustion chamber of the internal combustion engine.

28. The apparatus of claim 21, wherein the fuel injection system comprises a gaseous fuel injector being disposed to introduce said gaseous fuel upstream of a cylinder in the internal combustion engine.

29. The apparatus of claim 21, further comprising:
(g) a liquid-fuel pressure regulator receiving the liquid fuel from the liquid-fuel pump and providing pressure regulated liquid-fuel to the fuel injection system.

30. The apparatus of claim 21, further comprising:
(g) a liquid-fuel pressure regulator receiving the liquid fuel from the liquid-fuel pump and providing pressure regulated liquid-fuel to the gaseous-fuel pumping system.

31. The apparatus of claim 21, further comprising:
(g) a return conduit connected with the gaseous-fuel pumping system and the liquid-fuel supply and being operable to return the liquid fuel from said gaseous-fuel pumping system to the liquid-fuel supply.

32. The apparatus of claim 21, further comprising:
(g) a return conduit connected with the gaseous-fuel pumping system and an upstream side of the liquid-fuel pump, the return conduit being operable to return the liquid fuel from said gaseous-fuel pumping system to said upstream side.

33. The apparatus of claim 21, wherein the liquid-fuel pump is driven by the internal combustion engine.

34. The apparatus of claim 21, wherein the fuel injection system further receives the liquid fuel at the first pressure.

35. The apparatus of claim 34, wherein the fuel injection system further comprises an injector operable to receive the liquid fuel and the gaseous fuel and to inject said liquid fuel and said gaseous fuel independently and separately into the combustion chamber.

36. The apparatus of claim 21, wherein the gaseous-fuel pumping system comprises a gaseous-fuel pump and a driving mechanism, said gaseous-fuel pump receiving said gaseous fuel from the gaseous fuel supply and said driving mechanism being responsive to said liquid fuel at the first pressure to drive the gaseous-fuel pump to pressurize the gaseous fuel to the second pressure.

37. The apparatus of claim 36, wherein the computer is further programmed to control the driving mechanism to actuate said gaseous-fuel pump.

38. The apparatus of claim 36, wherein said driving mechanism comprises a hydraulic drive to drive said gaseous fuel pump.

39. The apparatus of claim 36, wherein said driving mechanism comprises a mechanical drive to drive said gaseous fuel pump.

40. The apparatus of claim 36, wherein said driving mechanism comprises an electric drive to drive said gaseous fuel pump.

41. The apparatus of claim 36, wherein said driving mechanism comprises a flow control device operable to switch the flow of the liquid fuel at the first pressure.

42. The apparatus of claim 36, wherein the gaseous-fuel pump is one of two gaseous-fuel pumps that operate in parallel and 180° out of phase with each other.

43. The apparatus of claim 36, wherein the gaseous-fuel pumping system further comprises a gaseous-fuel booster pump operating in series with the gaseous-fuel pump in a multi-stage arrangement.

44. The apparatus of claim 36, wherein said gaseous-fuel pump is a reciprocating piston-type pump.

45. The apparatus of claim 44, wherein the reciprocating piston-type pump comprises a piston selected from the group consisting of a single-acting piston and a double-acting piston.

46. The apparatus of claim 44, wherein the gaseous-fuel pump comprises a driving chamber, a compression chamber and a piston therebetween, the piston comprising a driving chamber face adjacent the driving chamber and a compression chamber face adjacent the compression chamber, a ratio of an area of the driving chamber face to an area of the compression chamber face being less than one.

47. The apparatus of claim 44, wherein the gaseous-fuel pump comprises a driving chamber, a compression chamber and a piston therebetween, the piston comprising a driving chamber face adjacent the driving chamber and a compression chamber face adjacent the compression chamber, a ratio of an area of the driving chamber face to an area of the compression chamber face being greater than one.

* * * * *